Dec. 18, 1923. 1,477,849
F. PARDEE
SPIRAL SEPARATOR AND METHOD OF SEPARATING MATERIALS
Filed March 28, 1922    4 Sheets-Sheet 1
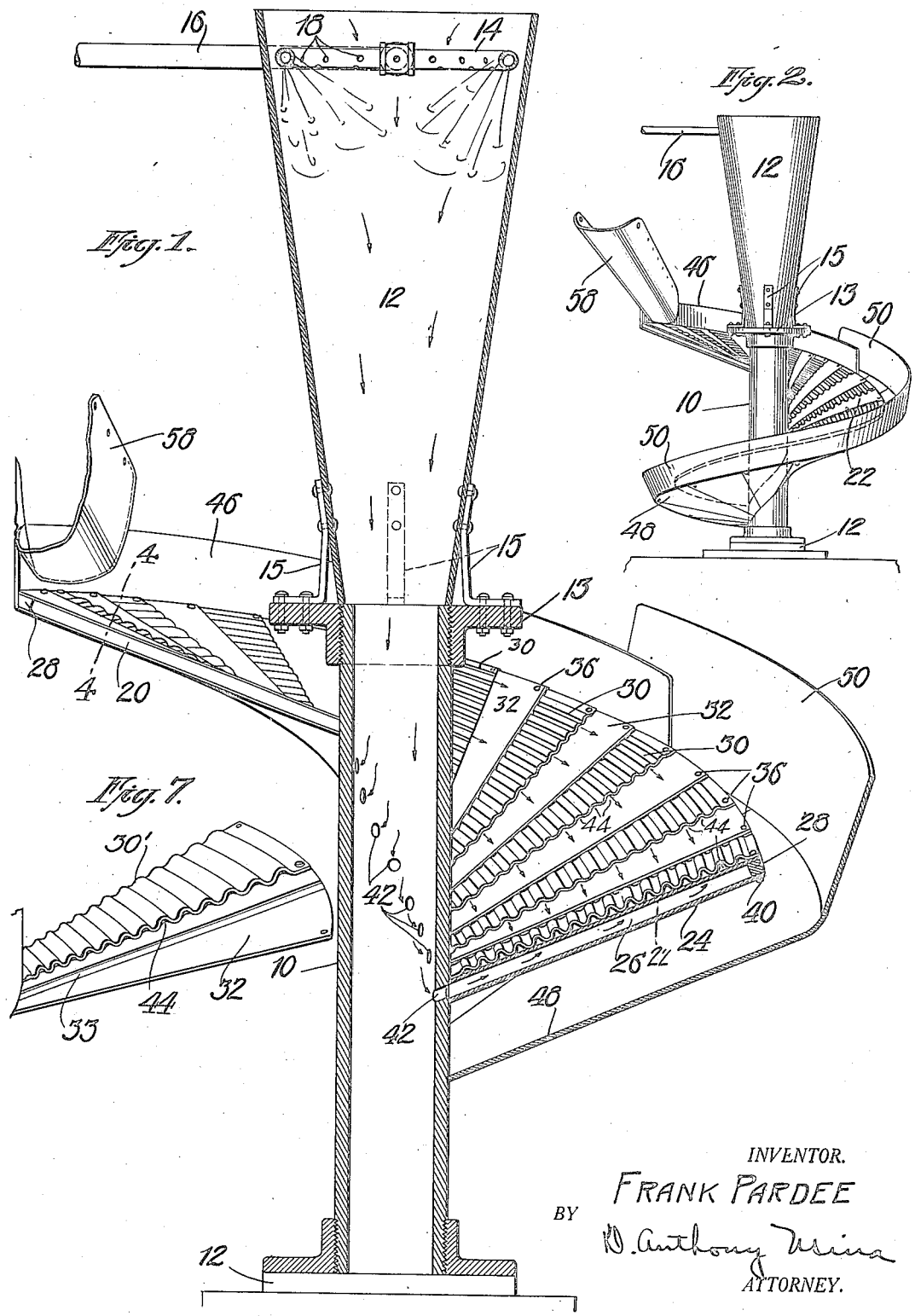
INVENTOR.
FRANK PARDEE
BY
ATTORNEY.

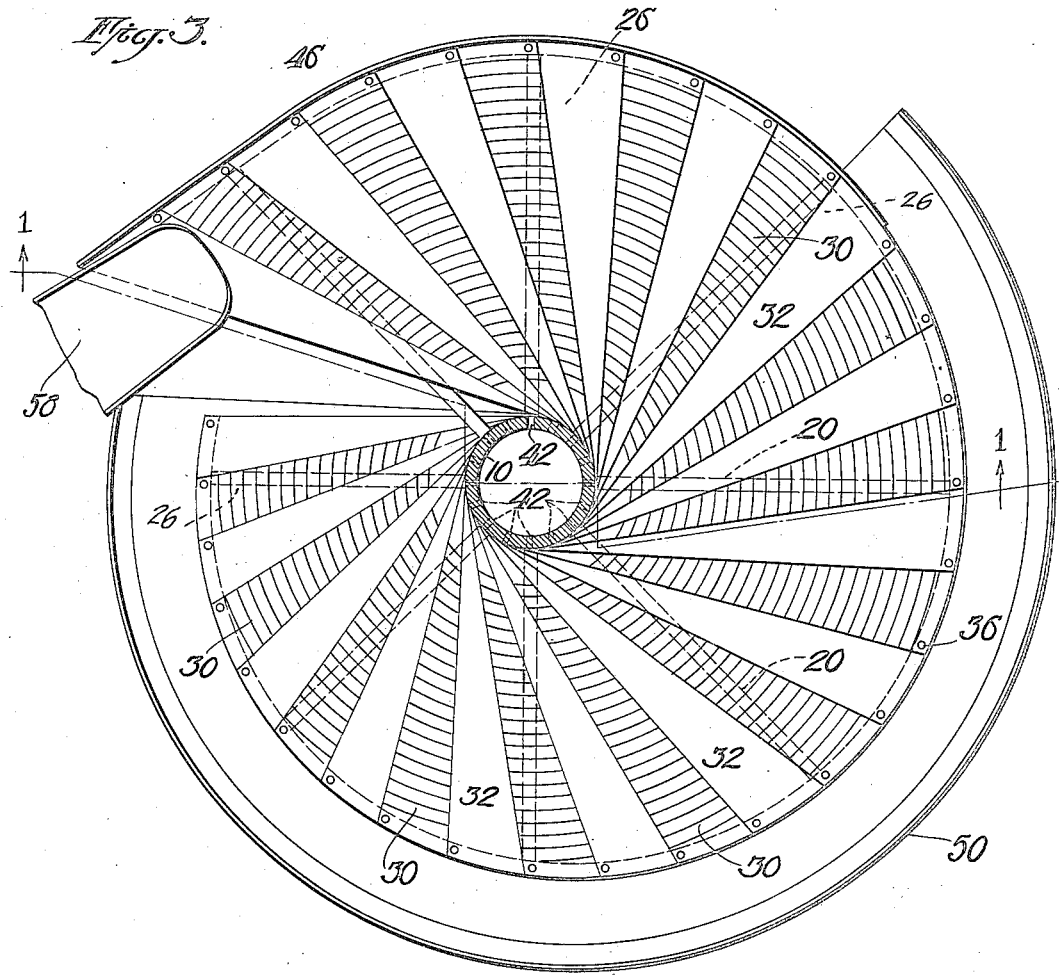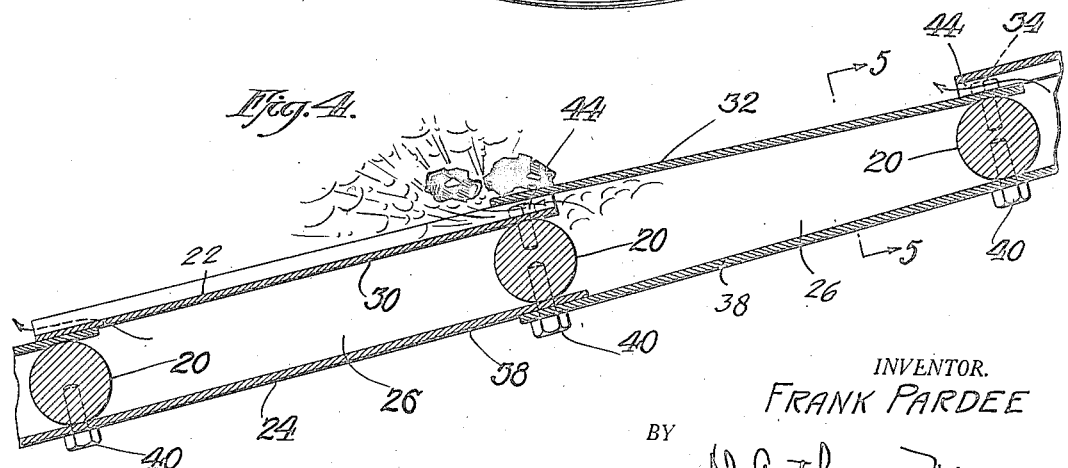

Dec. 18, 1923. 1,477,849
F. PARDEE
SPIRAL SEPARATOR AND METHOD OF SEPARATING MATERIALS
Filed March 28, 1922 4 Sheets-Sheet 3

INVENTOR.
FRANK PARDEE
BY
ATTORNEY.

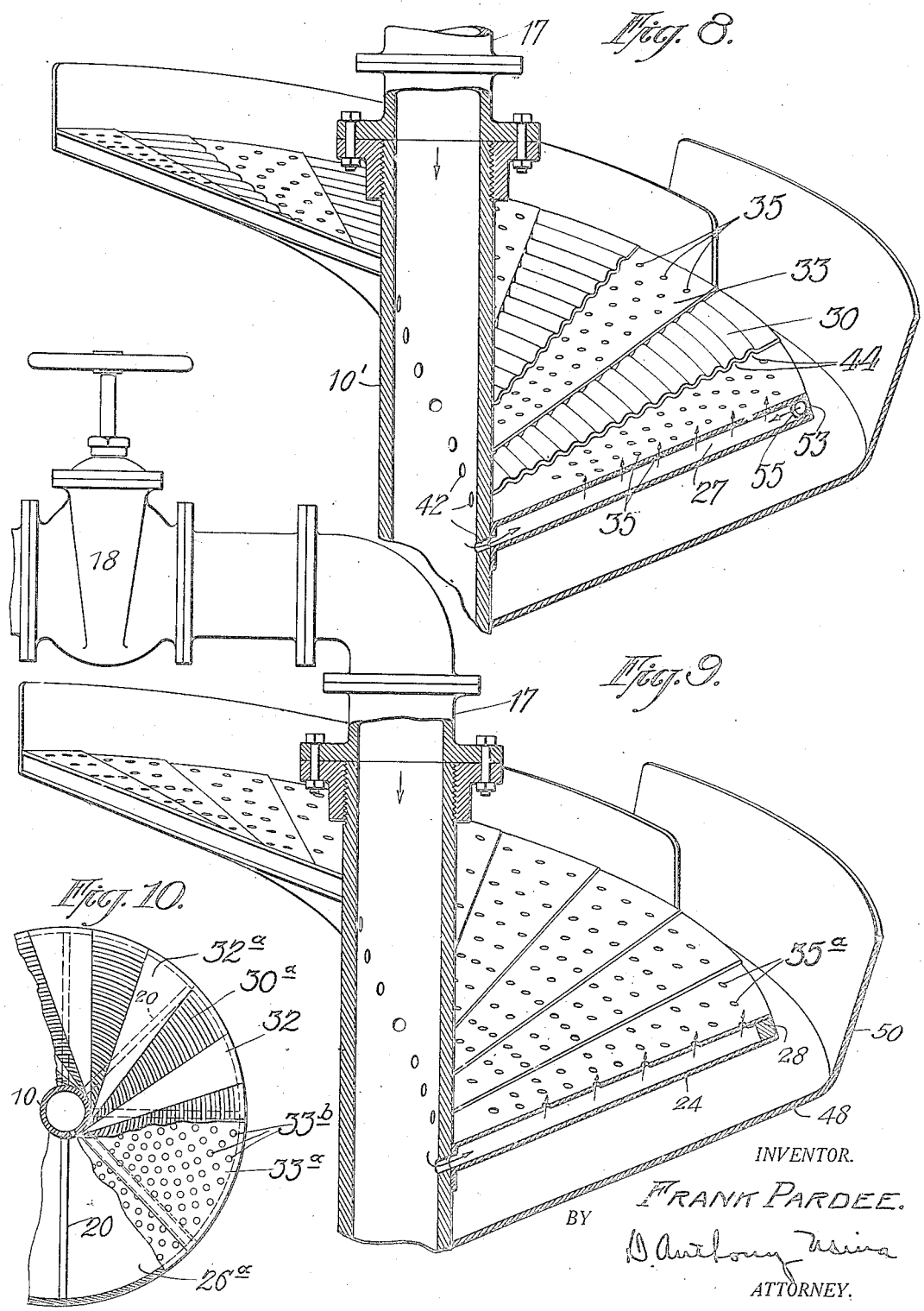

Patented Dec. 18, 1923.

1,477,849

UNITED STATES PATENT OFFICE.

FRANK PARDEE, OF HAZLETON, PENNSYLVANIA, ASSIGNOR TO ANTHRACITE SEPARATOR COMPANY, A CORPORATION OF PENNSYLVANIA.

SPIRAL SEPARATOR AND METHOD OF SEPARATING MATERIALS.

Application filed March 28, 1922. Serial No. 547,451.

*To all whom it may concern:*

Be it known that I, FRANK PARDEE, a citizen of the United States, and resident of Hazleton, Pennsylvania, have invented certain new and useful Improvements in Spiral Separators and Methods of Separating Materials, of which the following is a specification.

This invention relates to separators and aims to provide means and a method whereby fluid pressure can be utilized to assist in the separation of materials having different inherent characteristics.

One object of the invention is to provide an improved method for separating materials. Another object is to provide means for ejecting jets of steam, air or other fluid from a runway to cause a better and more rapid separation of materials than is attainable in separators heretofore constructed. Another object is to provide a spiral separator of much shorter length than those heretofore used yet capable of effecting a thorough separation of different classes of materials.

Another object is to provide a spiral separator having a chamber or chambers beneath the surface of the runway from which steam or other fluid can be discharged to assist in the separation of the materials being handled. A further object is to combine and organize the various instrumentalities herein described so that they individually and jointly perform the functions set forth.

Other objects will be apparent from the following specification when read in connection with the accompanying drawings in which—

Fig. 1 illustrates in vertical section one embodiment of the invention. The section is taken on the staggered line 1—1 of Fig. 3;

Fig. 2 is a front elevation of the separator of Fig. 1 on a smaller scale;

Fig. 3 is a plan of Fig. 1 with parts shown in horizontal section;

Fig. 4 is an enlarged section on the line 4—4 of Fig. 1 illustrating the action of the fluid jets in an exaggerated manner;

Fig. 6 is a plan showing an alternative construction and Fig. 7 is a view illustrating details of construction;

Figs. 8, 9 and 10 are details showing modifications.

Figure 6:
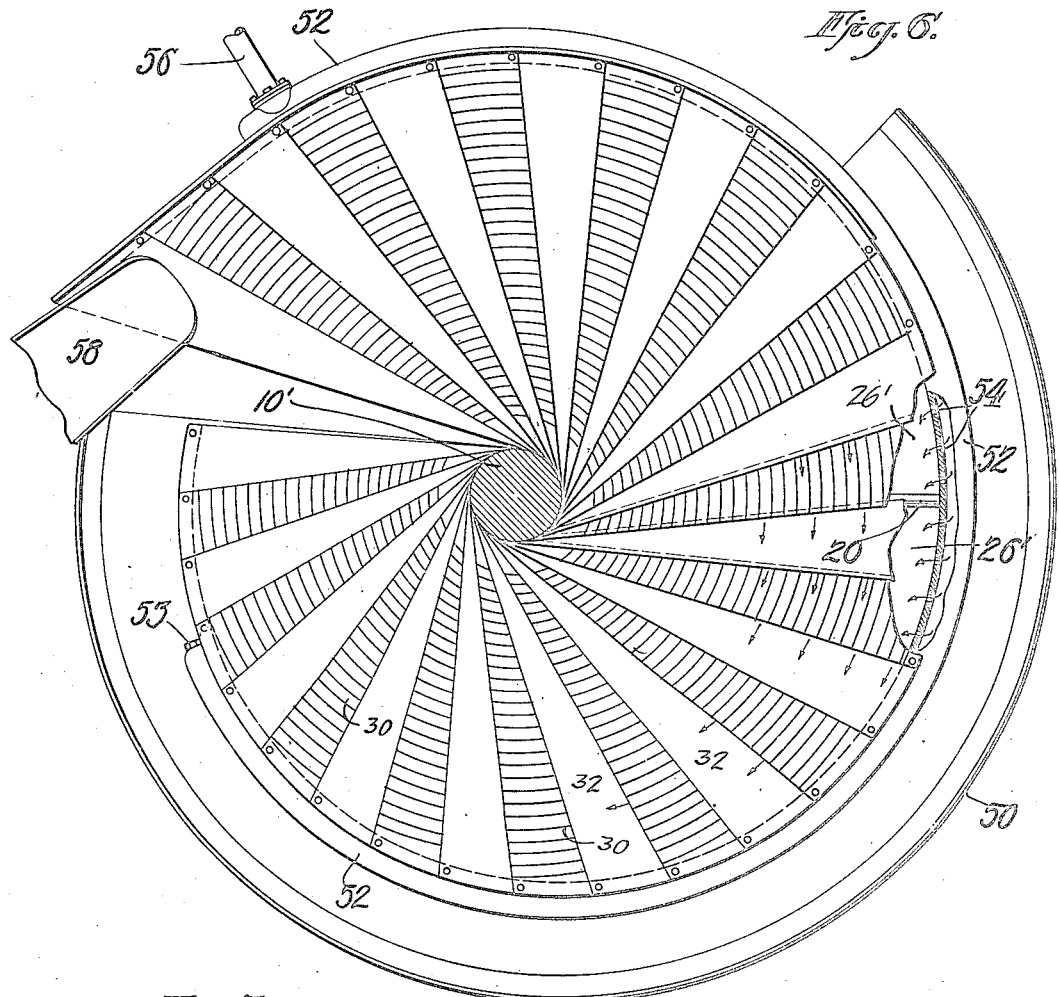
Figure 5:
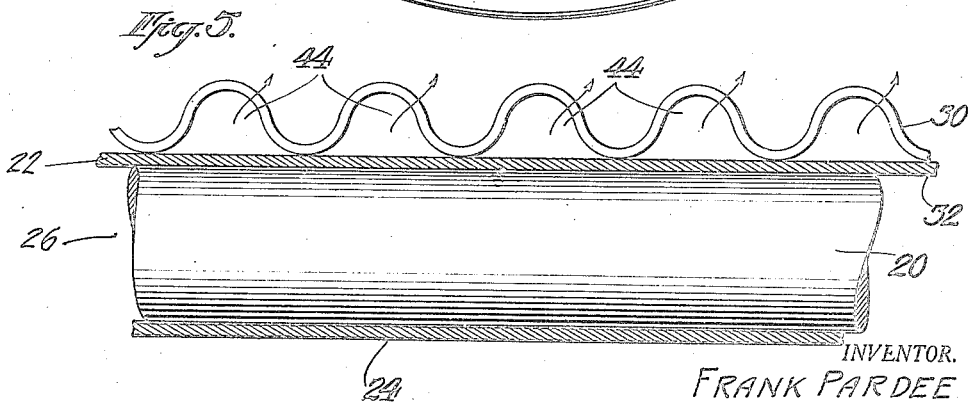
Fig. 5 is an enlarged section on the line 5—5 of Fig. 4.

Heretofore spiral separators have usually been built of considerable height having several convolutions and as the material flowed along the runway centrifugal force and friction caused the materials to follow in distinct paths. When handling a mixture of coal and slate and other impurities the coal being brighter and smoother than the slate gradually works toward an outer path on the runway and the slate and impurities having greater frictional qualities travel in an inner path. But in order to secure an effective separation it has heretofore been necessary to employ spiral runways of considerable length having several turns or convolutions.

In my improved separator I utilize a novel method whereby the length of the spiral runway is considerably reduced and yet an effective separation of materials is secured. The present improvement consists broadly in providing means and a method utilizing a fluid to assist in the separation of the materials being handled.

In the apparatus illustrated the separator comprises a spiral runway of approximately one full turn, although one of a fraction of a turn, or one having more than one turn could also be used, the runway is provided with means for ejecting jets of fluid to exert a lifting or pushing action or both a lifting and pushing action on the material to give it an impetus to augment the separating action due to centrifugal force.

My improved method can be carried out in many different structures. The accompanying drawings show different forms of apparatus embodying novel features but it is to be understood that I am not limited to such structures except as defined in the subjoined claims.

Referring first to Figs. 1 to 5, 10 represents a hollow column supported on a suitable base 12 and connected at the top with a frusto-conical tubular head 12. The head is carried by a cap 13 secured to the top of the column, said cap carrying supporting brackets 15 which are riveted or otherwise fastened to the head. Near the top of the head 12 is located a pipe 14 forming an annular conduit which is connected by a pipe 16 to a source of fluid supply. The pipe 14 is provided with a series of outlets 18 through which the fluid is discharged to the head 12. The fluid used is either air, steam or water or may be a combination of fluids. In the arrangement shown in Fig. 1 steam is discharged from the outlets 18 and draws in a volume of air through the open top of the head 12.

Instead of supplying the fluid as above described I may introduce it directly to the hollow column through a suitable inlet pipe 17 having a control valve 18 as shown in Fig. 8, or I may provide an installation as hereinafter described and shown in Fig. 6, wherein the fluid is introduced through a pipe following the general direction of the outer edge or periphery of the runway.

In the structures of Figs. 6 and 8 the fluid used is air which is preferable on account of the comparatively low cost of supplying it to the separator, although I am not limited to the use of any particular kind of fluid, in any of the structures shown or described.

The column 10 in Figs. 1 to 5 carries a plurality of rods 20 which extend outward and upward from the column to support the separator runway. The runway is formed with an upper wall 22 and a lower wall 24 spaced apart by the supporting rods 20 to form a series of segmental chambers 26 between said walls. At the peripheral edge the chambers 26 are closed by a spiral bar 28 to which the plates forming the walls 22 and 26 are bolted or otherwise secured. The upper wall 22 is formed of a series of substantially triangular plates which overlap along their adjacent edges. As shown particularly in Figs. 1 and 3 the alternate plates 30 of the upper wall are corrugated and the plates 32 between them are smooth. These plates are secured at suitable intervals to the radial rods 20 by bolts 34 or other suitable means, and are also secured by bolts 36 to the outer spiral rod 28. The plates 38 forming the lower wall of the runway 24 overlap along their adjacent edges as shown in Fig. 4 and are similarly secured to the radial rods 20 by bolts 40. The column 10 has formed therein a series of ports 42 arranged in spiral formation to communicate with the several chambers 26 so that the fluid can pass through the center of the column and into several segmental chambers. The arrangement is such that fluid can be discharged through the ports 44 formed between the corrugations between the plates 30 and the overlapping smooth plates 32 as indicated in Fig. 4. The corrugations may either be of uniform height and width or they may be of varying heights and widths so as to provide outlet ports of varying areas along different points in the width of the runway.

In Fig. 1, the corrugations are of substantially uniform height throughout the width of the runway and the lateral spacing between the peaks of the corrugations are substantially uniform; therefore, the ports formed thereby are of uniform area throughout the width of the runway. It is desirable in treating some classes of material to discharge a greater volume of fluid near the outer portion of the runway, and in such cases I corrugate the plates as shown in Fig. 7 wherein the plate 30' is formed so that the corrugations near the inner portion are comparatively low and near the outer portion are much higher, thereby forming ports 44 having a greater area near the outer surface of the runway, thus providing means whereby a larger volume of fluid can be discharged in this zone of the separator.

In this figure I also show an alternative form of plate 32 which is provided with a groove 33 adapted to convey any water or other condensate downwardly and inwardly toward the center of the runway.

Near the upper end of the spiral runway and secured along the outer edge is an upstanding flange 46 adapted to prevent the mixture which is orginally fed to the runway from skimming off the outer edge thereof. Below the separator runway is secured a conveyor thread 48 having substantially the same pitch as the separator runway and being provided with an outer flange 50. This conveyor is adapted to catch the purer grade of material which is thrown from the separator runway as hereinafter referred to.

In Fig. 6 I have illustrated an alternative arrangement which is constructed substantially the same as the above described apparatus with the exception that the central supporting column 10' is solid and the fluid is supplied to the chambers 26' from a spiral pipe 52 having a series of ports 54 formed therein which communicate with the several chambers 26'. The pipe 52 is connected to a pipe 56 which leads to a suitable source of supply. The pipe 52 also forms the closure for the outer ends of the chambers 26'. The lower end of the pipe 52 is closed by a suitable plug 53.

In Fig. 8 I have shown a structure in which the air or other fluid is fed directly to the hollow column 10 from a pipe 17 and through ports 42 to the chamber 27. Fluid is also supplied to a spiral pipe 53 which is provided with ports 55 opening into the chamber 27. In this structure the plates 30 are corrugated similar to those of Fig. 1 but the alternate plates 33 are perforated as at 35 to permit the fluid to flow from the bottom practically straight up. The jets issuing from the ports 44 will exert a combined pushing and lifting action on the material as it falls over the edges of the plate 30, and the jets issuing from the perforations 35 will exert a lifting action thus tending to reduce the friction between the material and the runway. The perforations 35 may be more or less numerous or of greater or less area at different locations on the surface of the runway to suit practical requirements.

Fig. 9 is a fragmentary view showing a separator having a runway in which all the jets issue upwardly through ports 35$^a$ so that the action on the material is more in in the nature of a lift than a push. The runway need not necessarily be supported on rods located between the upper and lower walls thereof for it is not absolutely essential that the space between the walls be divided into several separate chambers. If desired the runway could be carried on rods located below the lower wall 24 as will be readily appreciated, and the chamber formed between the upper and lower walls could be continuous from one end to the other of the runway. Or the chamber between the upper and lower walls could be divided by any suitable sort of partition and connected by suitable piping with an outside supply of fluid independent of the runway structure all as will be understood.

In Fig. 10 is illustrated a detail showing an alternative form of runway construction. In this figure the upper wall of the runway is formed of segmental supporting plates 33$^a$ which are secured to the radial rods 20. These plates are perforated as shown, and are used as supports for the corrugated plates 30$^a$ and the smooth plates 32$^a$ which are secured thereto in any suitable manner. This arrangement permits of the use of very thin material for the corrugated plates as the lower segmental plates take the strains and the corrugated plates form ports which control the direction in which the fluid is discharged and also form a renewable surface for the runway. It is clear that in this form of runway the fluid from the chamber 26$^a$ escapes through the perforations 33$^b$ and is discharged through the ports formed by the corrugations in the plates 30$^a$.

The apparatus illustrated is particularly adapted to separate coal from slate and other impurities but of course is not limited to such use. In operation a mixture of coal and slate and other impurities is fed from a suitably supported inclined chute 58 to the upper end of the separator runway 22. And as the mixture travels down the runway, due partly to centrifugal action and frictional characteristics of the coal and slate respectively, and partly to the action of the fluid discharged from the runway, the purer coal works toward an outer path on the runway, the slate being comparatively heavier and exerting a greater friction on the runway, travels more slowly and works toward an inner path. As each piece of material passes over an opening or port 44 in the runway, the frictional resistance is overcome to a certain degree by the jets of fluid discharged which tend to lift and push the material. Thus it is apparent that the fluid exerts a force which very materially aids in the rapid separation of the materials. The coal which is comparatively lighter is given an added impetus so that its tendency to travel toward the outer edge of the runway is increased, according to the shape of each individual piece, thus automatically taking care of cubes and flats or other fractures. The action on the slate and other heavier impurities is more in the nature of a gentle push and lift so that its friction is reduced and due to its greater specific gravity it tends to travel inward, it being remembered that the surface of the runway is inclined downwardly and inwardly.

The fluid issuing from the multiplicity of ports along the runway assumes a whirling or rotary motion due to the spiral pitch and the inward and downward pitch of the runway. In other words the fluid jets form sort of a spiral vortex which travels in the same general direction as the material on the runway. The fluid in the outer zone of the whirl or vortex travels faster than the fluid in the inner zone due partly to centrifugal action and partly to the difference in the angle at which the jets strike the inwardly inclined surface of the runway. This whirling spiral or helical movement of the fluid exerts a powerful force on the material being separated and enables a much faster and better separation than that obtainable in separators heretofore used. By increasing or decreasing the volume of fluid discharged from the runway the efficiency of the separator can be varied. Or the volume of fluid can be varied to correspond to the class of material being handled.

When the mixture to be separated is fed wet, the jets issuing from the runway will effectively dry the materials and prevent the smaller wet particles from sticking to and clogging the runway.

The purer coal is thrown off the outer edge of the separator runway and is caught by the conveyor thread 48 which carries it to a suitable chute, not shown, leading to a storage pile or bin. The coal which travels along the outer portion of the separator runway is also of high grade and is discharged to a suitable chute, not shown, at the end of the separator, and the slate and impurities which travel along the extreme inner path are similarly discharged to a waste pile or bin.

Though I have described with great particularity the details of the embodiments of the invention herein illustrated it is not to be interpreted that I am limited thereto, the invention being thought to be broadly new. Therefore changes may be made by those skilled in the art without departing from the invention as defined in the appended claims.

What I claim is:

1. In a separator a runway over which the material to be separated travels and means for supplying fluid pressure to exert a lifting and pushing action on said material to accelerate its travel at numerous points along the runway.

2. In a separator a spiral runway over which the material to be separated travels and means for discharging a fluid along the surface of said runway to exert a force on the material to aid in the separation thereof.

3. In a separator a spiral runway and means for discharging fluid jets from the runway in the general direction of travel of the material over the surface thereof.

4. In a separator a spiral runway and means for discharging a fluid therefrom at a multiplicity of points along the runway to assist in the separation of the material traveling on the runway.

5. In a separator a spiral runway and means for utilizing fluid pressure at different points along the runway for accelerating the speed of the material traveling on the runway.

6. In a separator a spiral runway and means for exerting a fluid pressure on the material to be separated tending to hold it outward from the center.

7. In a separator a spiral runway in combination with means for effecting a separating action by exerting direct fluid pressure on the material in the proper direction.

8. A friction separator in combination with means for exerting a fluid pressure at a multiplicity of points to assist in the separation throughout a considerable length of the separator.

9. A stationary spiral separator over which the material travels by gravity and means for removing water from the material handled by exposure to air currents discharged from different points along the spiral runway.

10. In a spiral separator a runway over which the material to be separated travels by gravity having a series of outlet ports and means for discharging a fluid through said ports to form a vortex to assist in the separation of the material traveling on the runway.

11. A separator having a chambered spiral runway over which the material to be separated travels by gravity, means for supplying air to said chambered runway and means for directing the flow of air from said chambered runway to assist in separating the material traveling thereon.

12. A separator comprising a spiral runway along which the material travels by gravity having spaced walls forming a chamber, means for supplying air to said chamber and means for discharging said air to exert a pushing action on the material traveling down the runway and to assist in the separation of said material.

13. In a separator a spiral runway and ports for discharging fluid jets from said runway to exert a pushing and lifting action on the materials traveling thereon, certain of said ports being of such area that a greater volume of fluid is discharged from certain portions of the runway than at other portions.

14. In a separator a chambered spiral runway having a series of outlet ports arranged transversely at different locations along the runway and adapted to direct a fluid substantially in the direction of the line of travel of the material on said runway, the ports in each series being spaced closer together near the outer portion of the runway than near the inner portion so that the greater volume of fluid is discharged in the outer zone of the runway.

15. A separator over which the material travels by gravity comprising a spiral runway having upper and lower walls spaced apart from each other, divisions between said walls forming a plurality of separate chambers, a series of outlet ports for directing the flow of fluid from each of said chambers, and means for supplying fluid to said chambers.

16. A separator comprising a spiral runway having upper and lower walls spaced apart from each other, divisions between said walls forming a plurality of separate chambers, a hollow central supporting column for said runway having ports connecting with said chambers, means for supplying fluid to said hollow column, said upper runway wall having portions shaped to form outlet ports for the fluid.

17. A separator comprising a spiral runway having upper and lower walls spaced apart from each other, divisions between said walls forming a plurality of separate chambers, a hollow central supporting column for said runway having ports connecting with said chambers, an upwardly and outwardly flared intake connected to said column, means for directing a series of jets of fluid downwardly through said intake so as to draw in a volume of air, portions of said upper wall of said runway being corrugated to form outlet ports for the fluid.

18. A separator comprising a spiral runway having upper and lower walls spaced apart from each other, a hollow column, outwardly extending rods carried by said column for supporting the runway and dividing the space between said walls into a plurality of separate chambers, means for supplying a fluid to said chambers and means for discharging said fluid along the runway to exert a pressure on the material traveling on the runway and to impart an impetus thereto.

19. A spiral separator including a runway formed of upper and lower walls spaced apart from each other, means for supplying fluid to the chamber between said walls, the upper wall of said runway including corrugated plates over which the material travels and forming ports through which the fluid is discharged so that as the material travels over the edges of said plates said material is subjected to the action of said fluid and its speed is accelerated thereby.

20. A separator including a spiral runway comprising an upper wall formed of alternately arranged corrugated and smooth plates and a lower wall spaced away from said upper wall, a hollow supporting column having outwardly and upwardly extending rods secured thereto and located between said upper and lower walls and forming partitions which divide the runway into a plurality of chambers, said hollow column being formed with ports communicating with said chambers, and said corrugated plates forming ports communicating with said chambers and means for supplying fluid pressure to said hollow column.

21. The method of separating materials which consists in subjecting said materials to centrifugal force and also subjecting them to fluid pressure to augment the centrifugal action and thereby increase their rate of travel.

22. The method of separating materials which consists in subjecting said materials to centrifugal separating force on a spiral runway and discharging fluid jets along the runway to exert an additional separating action on said materials.

23. The method of separating materials which consists in feeding said materials to a spiral runway and discharging jets of fluid at a plurality of points along the runway to accelerate the speed of said materials and to exert a lifting action thereon to decrease the frictional resistance between the material and the runway.

24. The method of separating materials which consists in subjecting said materials to the action of a volume of whirling fluid on a spiral runway to increase the rate of travel of said materials.

25. The method of separating materials which consists in subjecting said materials to centrifugal force on a spiral separator and subjecting said materials to the action of a volume of fluid having a whirling spiral motion to augment the separating action.

In witness whereof, I have hereunto signed my name.

FRANK PARDEE.